(12) United States Patent
Okawa (10) Patent No.: US 7,999,488 B2
(45) Date of Patent: Aug. 16, 2011

(54) IGNITION CONTROLLER, LIGHT SOURCE, PROJECTOR AND IGNITION CONTROL METHOD

(75) Inventor: Kazuo Okawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 512 days.

(21) Appl. No.: 12/213,678

(22) Filed: Jun. 23, 2008

(65) Prior Publication Data

US 2009/0001904 A1 Jan. 1, 2009

(30) Foreign Application Priority Data

Jun. 29, 2007 (JP) ................................. 2007-171781

(51) Int. Cl.
*G05F 1/00* (2006.01)
(52) U.S. Cl. .......................... 315/291; 315/307; 315/308
(58) Field of Classification Search .................. 315/291, 315/308, 361, 363
See application file for complete search history.

(56) References Cited

U.S. PATENT DOCUMENTS

| | | | | |
|---|---|---|---|---|
| 5,463,287 | A * | 10/1995 | Kurihara et al. | ............... 315/307 |
| 6,160,362 | A | 12/2000 | Shone et al. | |
| 6,888,321 | B2 * | 5/2005 | Arimoto et al. | ............... 315/289 |
| 6,979,960 | B2 | 12/2005 | Okawa et al. | |
| 7,439,681 | B2 | 10/2008 | Okawa | |
| 2003/0137260 | A1 | 7/2003 | Ohsawa | |
| 2003/0209986 | A1 | 11/2003 | Ishigami et al. | |
| 2004/0212286 | A1 * | 10/2004 | Horiuchi et al. | ............... 313/113 |
| 2006/0108949 | A1 * | 5/2006 | Suzuki et al. | ................. 315/291 |

FOREIGN PATENT DOCUMENTS

| | | |
|---|---|---|
| JP | B2-06-065175 | 8/1994 |
| JP | A-2000-058276 | 2/2000 |
| JP | B2-3125775 | 11/2000 |
| JP | A-2001-515650 | 9/2001 |
| JP | A-2004-39391 | 2/2004 |
| JP | A-2004-339391 | 2/2004 |
| JP | A-2004-207018 | 7/2004 |
| JP | A-2006-120502 | 5/2006 |
| JP | A-2006-344556 | 12/2006 |

* cited by examiner

*Primary Examiner* — Douglas W Owens
*Assistant Examiner* — Amy Yang
(74) *Attorney, Agent, or Firm* — Oliff & Berridge, PLC (57) ABSTRACT

An ignition controller that controls ignition of a discharge lamp discharging and emitting light between a pair of electrodes provided therein, the controller includes: an ignition device that ignites the discharge lamp, and a controller that controls a drive of the ignition device, in which the controller includes: a pulse applying unit that applies a high pressure pulse to the pair of electrodes by the ignition device, a direct current applying unit for applying a direct current to the pair of electrodes for a first period after applying the high pressure pulse, and an alternating current applying unit for applying a first alternating current to the pair of electrodes for a second period after the first period.

11 Claims, 6 Drawing Sheets

| ALTERNATING CURRENT STARTUP PERIOD | DIRECT CURRENT STARTUP PERIOD ||||||||||||||
| --- | --- | --- | --- | --- | --- | --- | --- | --- | --- | --- | --- | --- | --- | --- |
| | DC+ |||||||  DC− |||||||
| | 1ms | 5ms | 10ms | 100ms | 500ms | 1s | | 1ms | 5ms | 10ms | 100ms | 500ms | 1s |
| 10Hz | NONE | NONE | NONE | NONE | C | C | | NONE | NONE | NONE | NONE | C | C |
| 200Hz | B | A | A | B | B | C | | B | B | B | C | C | C |
| 250Hz | B | A | A | B | B | C | | B | B | B | C | C | C |
| 300Hz | B | A | A | B | B | C | | B | B | B | C | C | C |
| 500Hz | B | B | B | B | B | C | | B | B | B | C | C | C |
| 1kHz | B | B | B | B | B | C | | B | B | B | C | C | C |
| HIGH-FREQUENCY DRIVE 40kHz | B | B | B | B | B | C | | B | B | B | C | C | C |
| HIGH-FREQUENCY DRIVE 60kHz | B | B | B | B | B | C | | B | C | C | C | C | C |

NOTE: DUE TO A PROBLEM OF LIGHTING, A TEST IS NOT CONDUCTED WHEN A DIRECT CURRENT STARTUP PERIOD IS SHORTER THAN 500ms AND AN ALTERNATING CURRENT APPLIED DURING A ALTERNATING CURRENT STARTUP PERIOD IS LOW FREQUENCY (LESS THAN 10 Hz).

IGNITION CONTROLLER, LIGHT SOURCE, PROJECTOR AND IGNITION CONTROL METHOD

The entire disclosure of Japanese Patent Application No. 2007-171781, filed Jun. 29, 2007, is expressly incorporated by reference herein.

BACKGROUND

1. Technical Field

The invention relates to an ignition controller that controls ignition of a discharge lamp discharging and emitting light between a pair of electrodes provided therein, a light source, a projector, and an ignition control method for the discharge lamp.

2. Related Art

A discharge lamp such as an extra-high pressure mercury lamp including a light-emitting tube having a light-emitting portion provided with a discharge space in which a pair of electrodes are disposed, and a pair of sealing portions which extend away from each other sandwiching the light-emitting portion and are provided with an electrode-connecting wire has been traditionally known. In the discharge space of such discharge lamp, light-emitting materials such as mercury and rare gas are sealed. The mercury is adhered to easier-to-be-cooled one of the pair of the electrodes disposed in the discharge space when the discharge lamp is turned off. When a current is applied to such electrodes while the mercury is not evaporated due to insufficient temperature rise, the current scarcely flows between the electrodes since impedance between the electrodes is high. On the other hand, when the mercury is evaporated after the temperature is sufficiently raised, the current satisfactorily flows between the electrodes since the impedance between the electrodes lowers. Therefore, high-efficiency of temperature increase in the electrodes leads to startup time reduction for the discharge lamp.

As an ignition controller for controlling ignition of such discharge lamp, a high-pressure discharge lamp ignition device has been known, in which: an alternating current rectangular wave voltage is applied on startup of the discharge lamp; a direct current voltage is applied during a transition from a glow discharge to an arc discharge; and another alternating current rectangular wave voltage is applied during a steady lighting period (for example, see Document 1: JP-A-2004-39391).

In the high-pressure discharge lamp ignition device disclosed in Document 1, a high-frequency alternating current voltage is applied on startup of the discharge lamp for applying a current to each electrode corresponding to polarity reverse. Then, the direct current voltage is applied so that temperature of each electrode adequately increases. Further, another alternating current voltage is applied again so that lighting goes into a steady state.

However, in the high-pressure discharge lamp ignition device disclosed in Document 1, it is difficult to apply the current rapidly to the electrodes as in actuation by the direct current, since the alternating current voltage is applied to the discharge lamp when the lamp is actuated. Consequently, a current sufficient for raising the temperature cannot be applied to the electrodes. Therefore, the above-described discharge lamp tends to generate only one-way current conduction between the electrode to which mercury is not adhered and the other electrode to which the mercury is adhered (asymmetrical current [or half-wave current] drive). Such asymmetrical current may damage the electrodes. Additionally, when the temperature of the electrodes does not rapidly increase, the transition from the glow discharge period to the arc discharge period delays. This also may cause the damage to the electrodes.

SUMMARY

An object of the invention is to provide an ignition controller, a light source, a projector, and an ignition control method, which are capable of preventing damage on electrodes of a discharge lamp.

An ignition controller according to an aspect of the invention controls ignition of a discharge lamp discharging and emitting light between a pair of electrodes provided therein, the controller including: an ignition device that ignites the discharge lamp, and a controller that controls a drive of the ignition device, wherein the controller includes: a pulse applying unit that applies a high pressure pulse to the pair of electrodes by the ignition device, a direct current applying unit for applying a direct current to the pair of electrodes for a first period after applying the high pressure pulse, and an alternating current applying unit for applying a first alternating current to the pair of electrodes for a second period after the first period.

An exemplary discharge lamp can be a metal halide lamp, high pressure mercury lamp, or extra-high pressure mercury lamp, which includes a light-emitting tube having a light-emitting portion in which the pair of electrodes is disposed and a discharge space is formed and a pair of sealing portions which extend away from each other sandwiching the light-emitting portion.

As described, since mercury contained in the light-emitting material is adhered to the easier-to-be-cooled one of the pair of electrodes, a current scarcely flows between the electrodes unless mercury evaporates in accordance with a temperature rise in the electrodes.

On the other hand, the pulse applying unit of the invention applies the high pressure pulse to the electrodes of the light-emitting tube to cause a breakdown between the electrodes, and, subsequently the direct current applying unit applies the direct current to the pair of electrodes. Thus, sufficient electrical power can be supplied during a glow discharge period as compared to applying alternating current to the electrodes. Consequently, the temperature rise in the electrodes and evaporation of mercury adhered to the electrodes can be accelerated, which leads to a rapid transition from a glow discharge period to an arc discharge period. The electrodes may be damaged without rapid transition from glow discharge period to arc discharge period as discussed above. However, the invention can prevent the electrodes from being damaged by achieving the rapid transition.

After the first period for applying the direct current, the alternating current applying unit applies the alternating current to each electrode for a second period, which enhances light-emitting efficiency of the discharge lamp as compared with continuous application of the direct current.

Accordingly, the light-emitting efficiency of the discharge lamp can be improved while restraining damage on the electrodes.

In the above aspect of the invention, the discharge lamp preferably includes a light-emitting tube having a light-emitting portion in which a pair of electrodes including a first electrode and a second electrode are disposed and a discharge space is formed between the pair of electrodes and a reflector attached on an end of the light-emitting tube to reflect the light irradiated from the light-emitting portion substantially in the same direction as an illumination optical axis, in which the controller includes the direct current applying unit applies the direct current to the second electrode so that the direct current flows from the second electrode to the first electrode located adjacent to the end of the light-emitting tube fixed to the reflector.

Since the heat generated on the first electrode adjacent to the end of the light-emitting tube at which the reflector is attached (i.e. the electrode located adjacent to the reflector) is dissipated by the reflector, the first electrode is easier to be cooled than the second electrode (i.e. the electrode remote from the first end of the light-emitting tube and the reflector). Therefore, by applying the direct current to the second electrode so that the direct current flows from the second electrode remote from the reflector to the first electrode adjacent to the reflector, the direct current can be applied so that the direct current flows from hard-to-be-cooled electrode to the easier-to-be-cooled electrode. Since the direct current is applied in the direction for letting the current to flow with ease, sufficient electrical power can be supplied. In addition, since the temperature of each electrode securely increases, the evaporation of the mercury contained in the light-emitting material can be accelerated. Consequently, the discharge lamp can be ignited within a short time, so that the damage to the electrodes can be further restrained.

Preferably, the first period is between and including 1 msec and 500 msec. More preferably, the first period is between and including 5 msec and 100 msec.

When a period of applying the direct current to the discharge lamp is shorter than 1 msec (millisecond), the discharge lamp may not be suitably lit. On the other hand, when the above period is longer than 500 msec, the electrodes of the discharge lamp may be damaged. Accordingly, the damage on the electrodes can be restrained when the direct current applying unit applies the direct current to the electrodes of the discharge lamp for the duration between and including 1 msec and 500 msec. Further, when the direct current applying unit applies the direct current to the electrodes of the discharge lamp for the duration between and including 5 msec and 10 msec, the damage on the electrodes can be further restrained and the discharge lamp can be securely lit.

Preferably, a frequency of the alternating current applied to the discharge lamp for the second period is higher than 10 Hz and 60 kHz or lower.

The second period may preferably be set between and including 1 sec and 3 sec.

When the frequency of the alternating current applied to the discharge lamp during the second period is 10 Hz or lower, the discharge lamp may not be suitably lit and the electrodes may be damaged. Further, when the frequency of the alternating current applied to the discharge lamp for the second period is higher than 60 kHz, it is difficult to apply the current sufficient for increasing the temperature of the electrodes. In this case, an additional element for high-frequency oscillation needs to be provided on the ignition controller and complicated current-applying control becomes necessary. Further, when applying the current-application control is to be conducted by a high-frequency switch, components having excellent high-frequency characteristics needs to be used as a switch element, which results in increase in the cost of the ignition controller and requires some heat-dissipation measures to cope with heat loss increased by the high-frequency switch.

However, according to the aspect of the invention, the current is adequately applied to the electrodes by applying the alternating current with the frequency higher than 10 Hz and 60 kHz or lower, thereby improving startup characteristics of the discharge lamp. Thus, damage on the electrodes can be restrained. Further, the arrangement of the ignition controller can be simplified.

When the direct current applying unit of the ignition controller applies the direct current on the second electrode located remote from the reflector so that electrical conduction is established from the second electrode to the first electrode adjacent to the reflector, damage on the electrodes can be restrained even when the alternating current of 60 kHz is applied to each electrode.

In the above aspect of the invention, it is preferable that the controller includes: a steady lighting control unit that steadily lights the discharge lamp after the second period by applying a second alternating current to the discharge lamp with a frequency lower than an average frequency of the first alternating current applied to the discharge lamp during the second period.

When a relatively high-frequency alternating current keeps on being applied, the electrodes are severely damaged and degradation of the electrodes is caused. On the other hand, according to the aspect of the invention, the steady lighting control unit applies after the second period the alternating current with the frequency lower than the average frequency of the alternating current applied during the second period, thereby further restraining the damage on the electrodes. Accordingly, a prolonged lifetime and a steady lighting can be given to the discharge lamp.

A light source according to another aspect of the invention includes a discharge lamp including a light-emitting tube having a light-emitting portion provided with a discharge space in which a pair of electrodes are disposed and a pair of sealing portions which extend away from each other sandwiching the light-emitting portion and are provided with an electrode-connecting wire for connecting to the respective electrodes, and a reflector provided on one of the pair of sealing portions to reflect a light irradiated from the light-emitting portion in one direction, and the ignition controller according to the above aspect of the invention.

The lighting control method offers the same advantage as the above-described ignition controller.

Further, since the direct current applying unit of the ignition controller applies the direct current on the second electrode so that electrical conduction is established from the second electrode remote from the reflector to the second electrode adjacent to the reflector, startup characteristics of the discharge lamp are further improved and the damage on the electrodes are prevented.

A projector according to still another aspect of the invention includes the above-described light source.

The projector offers the same advantage as the above-described light source. In addition, since the projector prolongs the lifetime of the discharge lamp so that the discharge lamp and the light source need not be often replaced, thereby facilitating maintenance of the projector.

An ignition control method is for controlling ignition of a discharge lamp discharging and emitting a light between a pair of electrodes provided in the discharge lamp, the method including: a pulse applying step for applying a high pressure pulse to the pair of electrodes, a direct current applying step for applying a direct current to the pair of electrodes for a first period after applying the high pressure pulse, and an alternating current applying step for applying an alternating current to the pair of electrodes for a second period after the first period.

The lighting control method offers the same advantage as the above-described ignition controller.

Specifically, the pulse applying step applies the high pressure pulse, the direct current applying step applies the direct current to each electrode of the discharge lamp during the first period. Therefore, since sufficient electrical power is can be applied during the glow discharge period, the temperature increase in the electrodes and the evaporation of the mercury adhered to the electrode can be accelerated, thereby promoting the rapid transition from the glow discharge period to the arc discharge period. The light-emitting efficiency of the discharge lamp is also improved by applying the alternating current to each electrode during the second period in the alternating current applying step after the direct current applying step. Accordingly, the light-emitting efficiency of the discharge lamp can be improved while restraining damage on the electrodes.

BRIEF DESCRIPTION OF THE DRAWINGS

The invention will be described with reference to the accompanying drawings, wherein like numbers reference like elements.

DESCRIPTION OF EXEMPLARY
EMBODIMENT(S)

An embodiment of the invention will be described below with reference to the attached drawings.

[Arrangement of Projector 1]

Figure 1:
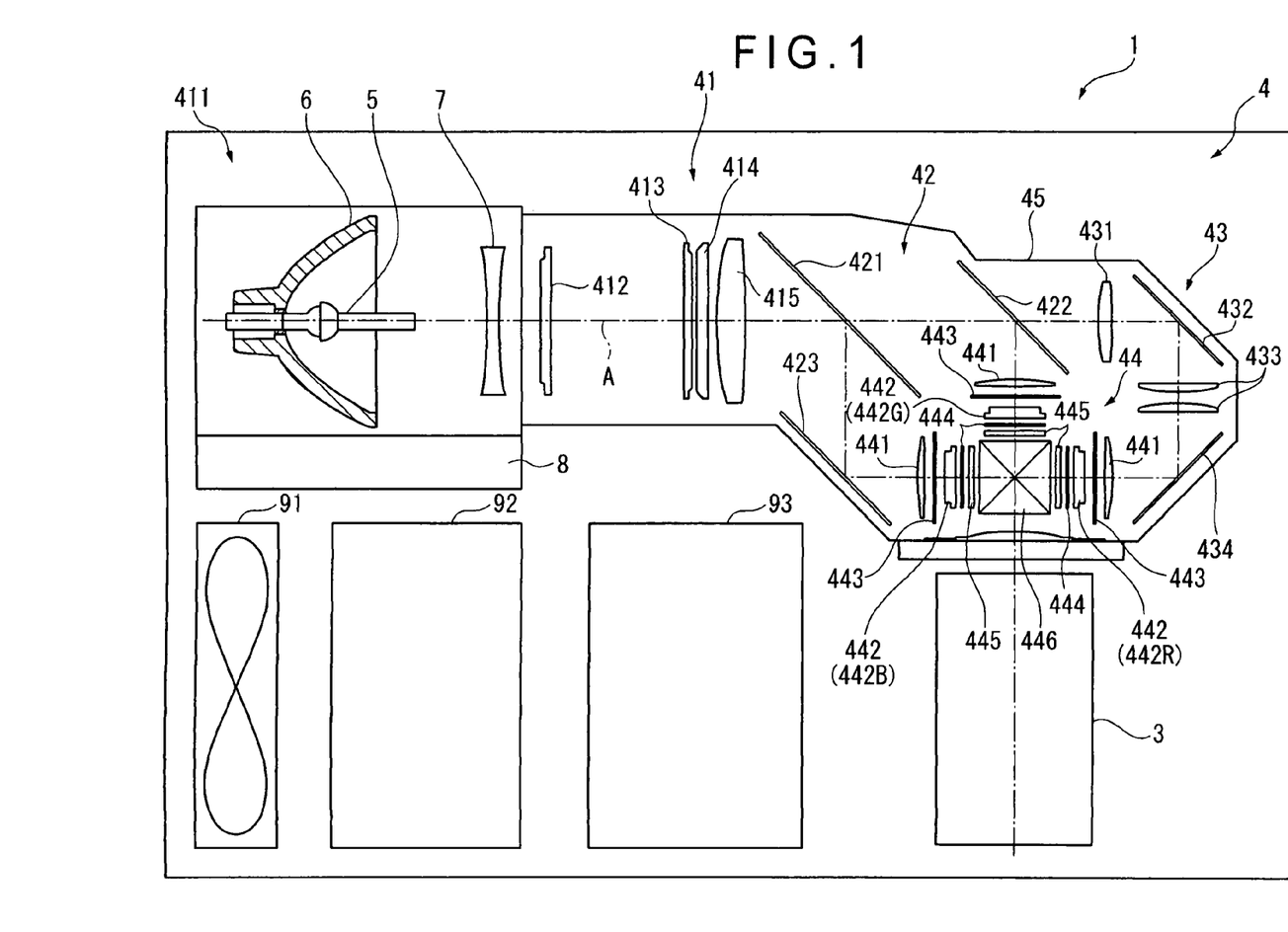
FIG. 1 is a schematic view showing an outline arrangement of a projector according to an exemplary embodiment of the invention.

FIG. 1 is a schematic view showing an outline arrangement of a projector 1 according to an exemplary embodiment of the invention.

The projector 1 modules a light beam irradiated from a light source 411 in accordance with image information to form image light, and projects an image of the image light on a projection surface such as a screen (not shown) in an enlarged manner. As shown in FIG. 1, the projector 1 includes an exterior casing 2, a projection lens 3 and an optical unit 4.

The projector 1 also includes a cooling unit 91 having a cooling fan for cooling inside of the projector 1, a power supply unit 92 for supplying electrical power to each component in the projector 1, a control unit 93 for controlling the whole projector 1. These components are all disposed in the exterior casing 2.

The power supply unit 92 converts a commercial alternating current into the direct current and increases/decreases an output voltage to a prescribed voltage corresponding to each component in the projector 1 to supply the electrical power to each component.

[Arrangement of Exterior Casing 2 and Projection Lens 3]

The exterior casing 2 is formed in a substantially rectangular-parallelepiped as a whole, in which the projection lens 3 and the optical unit 4 are accommodated. The exterior casing 2 is made of a synthetic resin. However, materials may not be limited to the synthetic resin. The exterior casing 2 may be made of, for example, metal.

The projection lens 3 (a projection optical device) provides an image according to the image light formed in the optical unit 4 on the projection surface such as the screen (not shown) and projects the image in an enlarged manner. The projection lens 3 is a lens set which accommodates a plurality of lenses in a cylindrical barrel.

[Arrangement of Optical Unit 4]

The optical unit 4 optically processes a light beam irradiated by the light source to form the image light in accordance with the image information under the control of the control unit 93. As shown in FIG. 1, the optical unit 4 extends along the rear side and along one of the lateral sides of the exterior casing 2 and forms an approximately L-shape in plan view.

The optical unit 4 includes an illumination optical device 41, a color-separating optical device 42, a relay optical device 43, an electric optical device 44 and an optical component casing 45. The optical component casing 45 accommodates these optical components 41 to 44 and fixedly supports the projection lens 3 at a predetermined position.

The illumination optical device 41 substantially uniformly illuminates an image formation area of each of the later-described liquid crystal panels 442 of the electric optical device 44. The illumination optical device 41 includes a light source 411, a first lens array 412, a second lens array 413, a polarizer 414 and a superposing lens 415.

The light source 411 includes a discharge lamp 5 for irradiating a radial light beam, a reflector 6 for reflecting the radial light beam irradiated from the discharge lamp 5 to converge the light beam to a predetermined position, an parallelizing concave lens 7 for parallelizing the light beam converged by the reflector 6 relative to an illumination optical axis A, an ignition controller 8 for controlling ignition of the discharge lamp 5, and a housing (not shown) that accommodates the above components 5-8. Arrangements of the discharge lamp 5, the reflector 6 and the ignition controller 8 will be described later in detail.

The first lens array 412 has a plurality of small lenses arranged in a matrix on a surface substantially orthogonal to the illumination optical axis A. These small lenses are substantially rectangular as seen in the optical axis A direction. The respective small lenses separate the light beam irradiated from the light source 411 into a plurality of sub-beams.

Similarly to the arrangement of the first lens array 412, the second lens array 413 includes the matrix of small lenses corresponding to the small lenses of the first lens array 412. Together with the superposing lens 415, the second lens array 415 focuses an image of the respective small lenses of the first lens array 412 onto the image formation area of the later-described liquid crystal panels 442 of the electric optical device 44.

The polarizer 414 is disposed between the second lens array 413 and the superposing lens 415, which converts lights from the second lens array 413 into substantially uniform-type linear polarized lights.

Specifically, the respective sub-beams converted into substantially uniform (i.e. single-type) linear polarized lights by the polarizer 414 are substantially superposed on the image formation area of the later-described liquid crystal panel 442 by the superposing lens 415. For a projector employing the liquid crystal panels for modulating polarized lights, only a single type polarized light can be utilized so that an approximately half of the lights from the light source 411 emitting random polarized lights are not used. However, by using the polarizer 414, the lights irradiated from the light source 411 are converted into the substantially uniform linear polarized light to enhance the light utilization efficiency in the electric optical device 44.

The color-separating optical device 42 has two dichroic mirrors 421 and 422 as well as a reflection mirror 423 and separates the plurality of sub-beams irradiated from the illumination optical device 41 by the dichroic mirrors 421 and 422 into three color light components of red (R), green (G) and blue (B).

The relay optical device 43 includes an incident-side lens 431, a relay lens 433 and reflection mirrors 432, 434 and guides a red light separated by the color-separating optical device 42 to a red-light liquid crystal panel 442R.

Red and green lights of the light beams irradiated from the illumination optical device 41 are transmitted by the dichroic mirror 421 of the color-separating optical device 42 and a blue light thereof is reflected by the dichroic mirror 421. The blue light that has been reflected by the dichroic mirror 421 is reflected by the reflection mirror 423 and passes through a field lens 441 to reach a blue-light liquid crystal panel 442B. The field lens 441 converts the respective sub light beams irradiated from the second lens array 413 into light beams parallel to the central axis (main beam) of the sub-beams. The field lenses 441 provided on the light-incident sides of a green-light liquid crystal panel 442G and the red-light liquid crystal panel 442R function in the same manner.

The green light, out of the red and green lights transmitted by the dichroic mirror 421, is reflected by the dichroic mirror 422 and passes through the field lens 441 to reach the green-light liquid crystal panel 442G. The red light passes through the dichroic mirror 422, the relay optical device 43 and the field lens 441 to reach the red-right liquid crystal panel 442R. Note that the relay optical device 43 is used for the red light in order to avoid deterioration in the light utilization efficiency due to light dispersion and the like caused by the optical path of the red light longer than those of the other color lights. In other words, the relay optical device 43 is used for directly transmitting the sub-beams incident on the incident-side lens 431 to the field lens 441. Although the red light out of the three color lights is adapted to pass through the relay optical device 43, the blue light, for instance, may pass through the relay optical device 43.

The electric optical device 44 modulates each of the three color lights irradiated by the color-separating optical device 42 in accordance with the image information, combines each of the modulated color lights to form an optical image (a color image).

As shown in FIG. 1, the electric optical device 44 includes the above-described field lens 441, the three liquid crystal panels 442 as a optical modulator (including the red-light liquid crystal panel 442R, the green-light liquid crystal panel 442G and the blue-light liquid crystal panel 442B), three incident-side polarization plates 443 respectively disposed on the light-incident sides of the liquid crystal panels 442, three view angle compensating plates 444 respectively disposed on the light-irradiation sides of the liquid crystal panels 442, three irradiation-side polarization plates 445 respectively disposed on the light-irradiation sides of the view angle compensating plates 444, and a cross dichroic prism 446 as a color-combining optical device.

On the incident-side polarization plate 443, the color lights of which the polarization direction is substantially aligned to one direction by the polarizer 414 are incident, so that only the polarized lights substantially in the same direction as the polarization direction of the light beams aligned by the polarizer 414 pass through the incident-side polarization plate 443 and the light beams in other directions are absorbed. The incident-side polarization plate 443 has a transmissive substrate made of, for instance, sapphire glass or crystal with a polarization layer attached on the substrate.

The liquid crystal panels 442 as the optical modulator have liquid crystal as electro-optic materials hermetically sealed between a pair of transparent glass substrates (not shown in detail). The liquid crystal panels 442 control alignment of the liquid crystal in accordance with a drive signal (the image information) input from the control unit and modulate the polarization direction of polarized lights to form the image lights.

The view angle compensating plates 444 are formed in a film shape, and compensate a phase difference between ordinary light and extraordinary light caused by birefringence at the liquid crystal panels 442 when the light beams are obliquely incident on the liquid crystal panels 442 (e.g. when the light beams are incident obliquely relative to the normal direction of a panel surface). The view angle compensating plates 444 have an optically anisotropic body with negative uniaxial property and are oriented such that an optical axis thereof faces a predetermined direction of a film surface and inclines with a predetermined angle toward the out-of-plane direction of the film surface.

The view angle compensating plates 444 may be made of, for instance, a discotic compound layer with an orientation layer on a transparent support such as cellulose triacetate (TAC). A WV film (FUJI PHOTO FILM CO., LTD. product) may be used as the view angle compensating plates 444.

The irradiation-side polarization plates 445 transmit only a light beam having a polarization axis orthogonal to the light-transmissive axis of the incident-side polarization plates 443 out of the light beams that have been irradiated from the liquid crystal panels 442 and absorb the other light beams. Such irradiation-side polarization plates 445 have the same arrangement as the above-described polarization plates 443.

The cross dichroic prism 446 combines modulated lights that have been modulated for each color light irradiated from the irradiation-side polarization plate 445 to form an optical image (a color image). The cross dichroic prism 446 is square in plan view formed by attaching four right-angle prisms. Two dielectric multilayer films are formed on the boundaries where the right-angle prisms are attached to each other. The dielectric multilayer films transmit the color light that has passed through the irradiation-side polarization plate 445 disposed on a side opposing to the projection lens 3 (on the green-light liquid crystal panel side) and reflect the color lights that have passed through the other two irradiation-side polarization plates 445 (on the red- and blue-light liquid crystal panel sides). With such arrangement, the color lights modulated by the incident-side polarization plates 443, the liquid crystal panels 442, the view angle compensating plates 444 and the irradiation-side polarization plates 445 are combined to form the color image.

[Arrangement of Discharge Lamp 5]

Figure 2:
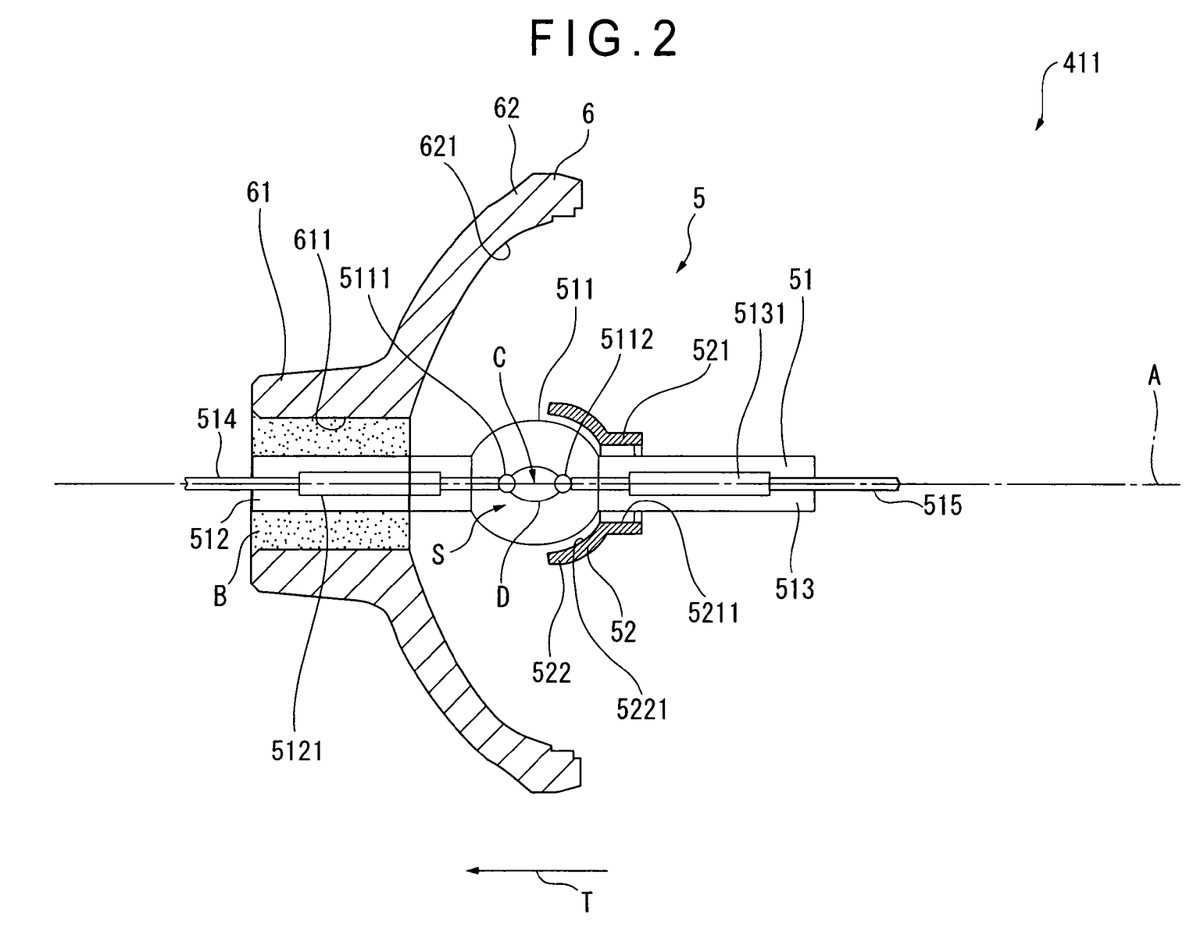
FIG. 2 is a vertical cross section showing a discharge lamp and a reflector of the above exemplary embodiment.

FIG. 2 is a cross-sectional view showing the discharge lamp 5 and a reflector of the light source 411.

The discharge lamp 5 is a light source that emits light by applying a voltage. As shown in FIG. 2, the discharge lamp 5 includes the light-emitting tube 51 made of a silica glass and a sub-reflector 52 attached to the light-emitting tube 51. The discharge lamp 5 may be various high intensity discharge light-source lamps. Specifically, the discharge lamp 5 may be a metal halide lamp, a high pressure mercury lamp, or an extra-high pressure mercury lamp and the like.

[Arrangement of Light-Emitting Tube 51]

The light-emitting tube 51 includes the light-emitting portion 511 of which the center area is bulged substantially spherically and the pair of sealing portions 512 and 513 that sandwich in the light-emitting portion 511 and extend away from both ends of the light-emitting portion 511. The sealing portions 512 and 513 are disposed respectively on the left and right sides in FIG. 2.

A pair of electrodes 5111 and 5112 are provided in the light-emitting portion 511. Between the pair of electrodes 5111 and 5112, a discharge space S is formed and the light-emitting material containing mercury, rare gas and a small quantity of halogen is sealed therein. During the later-described direct current startup period, the electrode 5111 is set as a cathode and the electrode 5112 is set as an anode.

Molybdenum metal foils 5121 and 5131 that are electrically connected to the pair of electrodes 5111 and 5112 in the light-emitting portion 511 are inserted in the pair of sealing portions 512 and 513. The ends of the pair of sealing portions 512 and 513 on opposite sides of the light-emitting portion 511 are sealed with a glass material and the like. Electrode-connecting wires 514 and 515 are respectively connected to the metal foils 5121 and 5131 and extend toward the outside of the light-emitting tube 51. When the later-described ignition controller 8 applies a voltage to the electrode-connecting wires 514 and 515, a potential difference is caused between the electrodes 5111 and 5112 through the metal foils 5121 and 5131 to generate a discharge, and an arc image D is formed to emit light within the light-emitting portion 511.

[Arrangement of Reflector 6]

The arrangement of the reflector 6 will be described below.

The reflector 6 is an integrated glass molding that reflects incident lights to converge on a second focal point on the illumination optical axis A. The reflector 6 is fixed to one of the sealing portions 512 of the discharge lamp 5 (the sealing portion 512 provided on the base end in the light beam irradiating direction of the light source 411) by an adhesive B. The reflector 6 includes a substantially cylindrical neck portion 61 to which the sealing portion 512 is inserted, and a concavely curved reflecting portion 62 which extends from the neck portion 61.

A reflecting surface 621 provided with a vapor-deposited metallic thin film is formed on the rotation-curved surface on the side facing the discharge lamp 5 in the reflecting portion 62. The reflecting surface 621 reflects visible lights and is formed as a cold mirror for transmitting infrared radiation and ultraviolet radiation.

The aperture 611, which is approximately circular in plan view, is provided on the neck portion 61. The adhesive B is injected into the aperture 611 with the sealing portion 512 inserted to the aperture 611, thereby bonding the sealing portion 512 and the reflector 6. At this time, the discharge lamp 5 and the reflector 6 are positioned such that the center C of the arc image D in the light-emitting portion 511 of the discharge lamp 5 is adjacent to the first focal point of the reflecting surface 621 of the reflector 6.

Although the reflector 6 is an ellipsoidal reflector having a spheroidal surface with the above arrangement, the reflector 6 may be a parabolic reflector having a paraboloid surface. In such case, the parallelizing concave lens 7 may be omitted. Also, a free curved reflector may be used as the reflector 6.

[Arrangement of Sub-Reflector 52]

The sub-reflector 52 is formed of glass and mounted on the sealing portion 513 (the sealing portion provided on a side opposite to the side at which the reflector 6 is mounted) in the light-emitting tube 51. The sub-reflector 52 is formed of the same materials as the light-emitting tube 51. The sub-reflector 52 includes a substantially cylindrical neck portion 521 having an aperture 5211 to which the sealing portion 513 is inserted, and a reflecting portion 522 which extends from the neck portion 521.

The reflecting portion 522 is positioned to cover the part of the light-emitting portion 511 adjacent to the sealing portion 513 (the tip end of the light source 411 in the light beam irradiating direction) and is formed in a substantially bowl shape along the contour of the light-emitting portion 511. A reflecting surface 5221 is provided on the surface opposite to the light-emitting portion 511 of the reflecting portion 522. The reflecting surface 5221 is formed as a cold mirror that reflects visible lights and transmits infrared radiation and ultraviolet radiation.

By providing the sub-reflector 52 on the light-emitting tube 51, the light emitted toward the side opposite to the reflector 6 out of the lights emitted from the light-emitting portion 511 is incident on the reflecting surface 621 of the reflector 6 by the reflecting surface 5221. The above-described light is reflected by the reflecting surface 621 to be converged on the second focal point, as well as the lights which are directly incident on the reflecting surface 621 from the light-emitting portion 511. This can suppress generation of lights which are directly emitted toward the tip end of the light source 411 in the light beam irradiating direction from the light-emitting portion 511 and are not incident on the first lens array 412 positioned on a rear stage of the optical path of the light source 411.

By providing the sub-reflector 52 on the light-emitting tube 51, the electrode 5112 covered by the sub-reflector 52 is hard to be cooled as compared with the electrode 5111 adjacent to the reflector 6.

[Arrangement of Ignition Controller 8]

Figure 3:
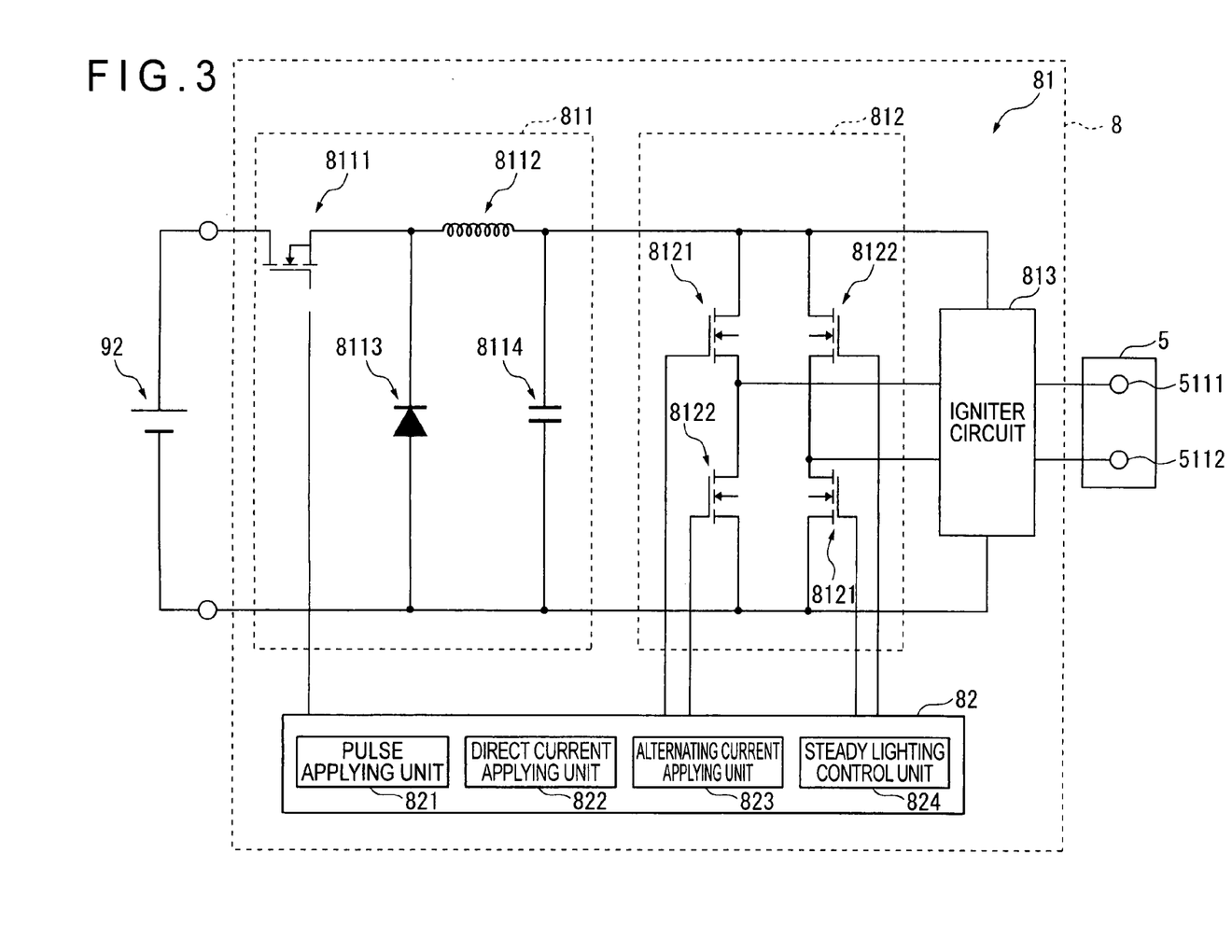
FIG. 3 is a schematic view showing an arrangement of an ignition controller of the above exemplary embodiment.

FIG. 3 is a schematic view showing an arrangement of an ignition controller.

As discussed, the ignition controller 8 controls the ignition of the discharge lamp 5 and is formed of a plurality of circuit elements. As shown in FIG. 3, the ignition controller 8 includes an ignition device 81 and a controller 82.

The ignition device 81 applies electric power supplied from a power supply unit 92 to the electrodes 5111 and 5112 of the discharge lamp 5 to ignite the discharge lamp 5. The ignition device 81 includes a step-down chopper 811, an inverter bridge 812 and an igniter circuit 813.

The step-down chopper 811 is a circuit for dropping the direct current input voltage of substantially 300V-400V to the voltage of substantially 50V-150V suitable for igniting the discharge lamp 5. The step-down chopper 811 includes a switch element 8111 and a coil 8112 which are series-connected, and a diode 8113 and a capacitor 8114 which are connected divergingly from the element 8111 and the coil 8112.

The switch element 8111 drops the direct voltage input from the power supply unit 92 to the desired voltage. The coil 8112, the diode 8113 and the capacitor 8114 work as elements for removing and rectifying high-frequency components of an input direct current and regularizing the input direct current.

The inverter bridge 812 converts the direct current into an alternating current with rectangular wave, which is a bridge circuit including a pair of transistors 8121 and a pair of transistors 8122. The electrodes 5111 and 5112 of the discharge lamp 5 are respectively connected between the transistors 8121 and 8122.

A direct current rectified through the step-down chopper 811 is input into the bridge circuit. After giving a pulse signal to the transistors 8121 and 8122, a path including the pair of transistors 8121 and a path including the pair of transistors 8122 are short-circuited and are live with electricity, whereby the rectangular wave alternating current is supplied to the discharge lamp 5 connected therebetween.

Further, the direct current is supplied to the discharge lamp 5 when one of the pairs of transistors 8121 and 8122 are fixed in an on-state and the other pair of transistors are fixed in an off-state.

The igniter circuit 813 performs dielectric breakdown between the electrodes 5111 and 5112 to urge the discharge lamp 5 to be actuated, and is connected between the step-down chopper 811/the inverter bridge 812 and the discharge lamp 5 to be parallel to the discharge lamp 5.

Though not shown in detail, the igniter circuit 813 includes a high-voltage pulse generating circuit and a pulse transformer. The high-voltage pulse generating circuit is connected to a primary side of the pulse transformer and a high-voltage pulse generated in the high-voltage pulse generating circuit is boosted on a secondary side of the pulse transformer. By applying the boosted voltage to the electrodes 5111 and 5112, the dielectric breakdown between the electrodes 5111 and 5112 is performed and the electric conductivity path is established for igniting the discharge lamp 5.

The controller 82 applies the voltage to the switch element 8111 and transistors 8121 and 8121 forming the above-described step-down chopper 811 and the inverter bridge 812 for controlling an on/off state, thereby controlling a drive of the ignition device 81 to control the ignition of the discharge lamp 5. The controller 82 includes a pulse applying unit 821, a direct current applying unit 822, an alternating current applying unit 823 and a steady lighting control unit 824.

Figure 4:
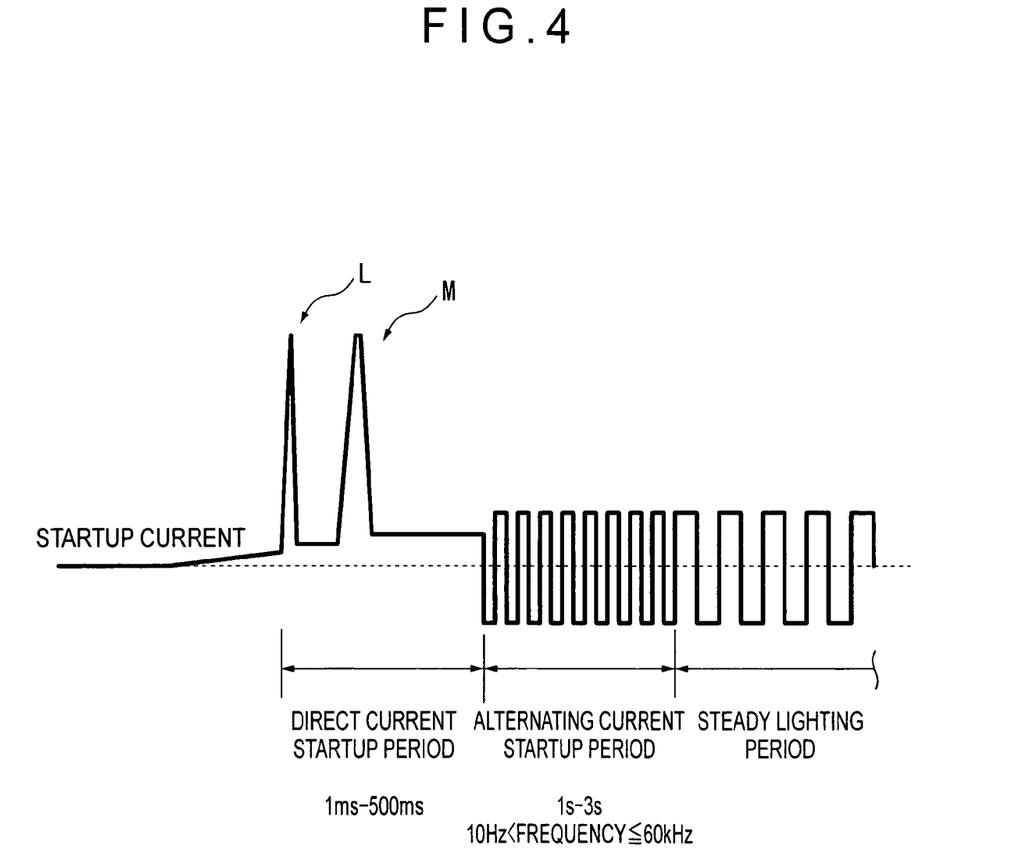
FIG. 4 illustrates a waveform of a current applied to an electrode of the above exemplary embodiment.

FIG. 4 is an illustration showing a waveform of a current applied to the electrodes 5111 and 5112. In the FIG. 4, "ms" indicates "millisecond" and "s" indicates "second".

The pulse applying unit 821 outputs a control signal to the igniter circuit 813 for operating the igniter circuit 813 when igniting the discharge lamp 5. Specifically, the pulse applying unit 821 produces a high pressure pulse (indicated by an arrow L in FIG. 4) in the igniter circuit 813 for applying the high pressure pulse to the electrodes 5111 and 5112.

The direct current applying unit 822 controls the on/off state of the respective transistors 8121 and 8122 in the inverter bridge 812 and applies the direct current to the electrodes 5111 and 5112 through the inverter bridge 812. Specifically, the direct current applying unit 822 controls the on/off state of the respective transistors 8121 and 8122 after applying the above-described high pressure pulse, and applies the direct current to the electrodes 5111 and 5112 in the direction from the anode electrode 5112 to the cathode electrode 5111 (an arrow T direction in FIG. 2). A direct current startup period for applying the direct current corresponds to the first period according to the exemplary embodiment of the invention. The first period is between and including 1 msec and 500 msec. A pulse indicated by an arrow M in FIG. 4 is an inrush current when transiting from the glow discharge period to the arc discharge period.

Similar to the direct current applying unit 822, the alternating current applying unit 823 controls the on/off state of respective transistors 8121 and 8122 to apply the alternating current to the electrodes 5111 and 5112 through the inverter bridge 812. Specifically, the alternating current applying unit 823 applies the alternating current of a frequency higher than 10 Hz and 60 kHz or lower to the electrodes 5111 and 5112 after the above-described direct current startup period. An alternating current startup period for applying the alternating current corresponds to a second period according to the exemplary embodiment of the invention, which is set between and including 1 sec and 3 sec.

The steady lighting control unit 824 applies an alternating current with a frequency lower than the average frequency of the alternating current applied by the alternating current applying unit 823 to the electrodes 5111 and 5112 through the inverter bridge 812. For example, when the alternating current applying unit 823 applies alternating current of 200 Hz, the steady lighting control unit 824 controls the on/off state of the respective transistors 8121 and 8122 to generate and apply the alternating current of 100 Hz to the electrodes 5111 and 5112 after the above-described alternating current startup period. During the steady lighting period for applying the alternating current, the temperature of the electrodes 5111 and 5112 sufficiently increases and mercury contained in the light-emitting material is adequately evaporated, so that the lighting of the discharge lamp 5 is stabilized.

[Ignition Control of Discharge Lamp 5]

Figure 5:
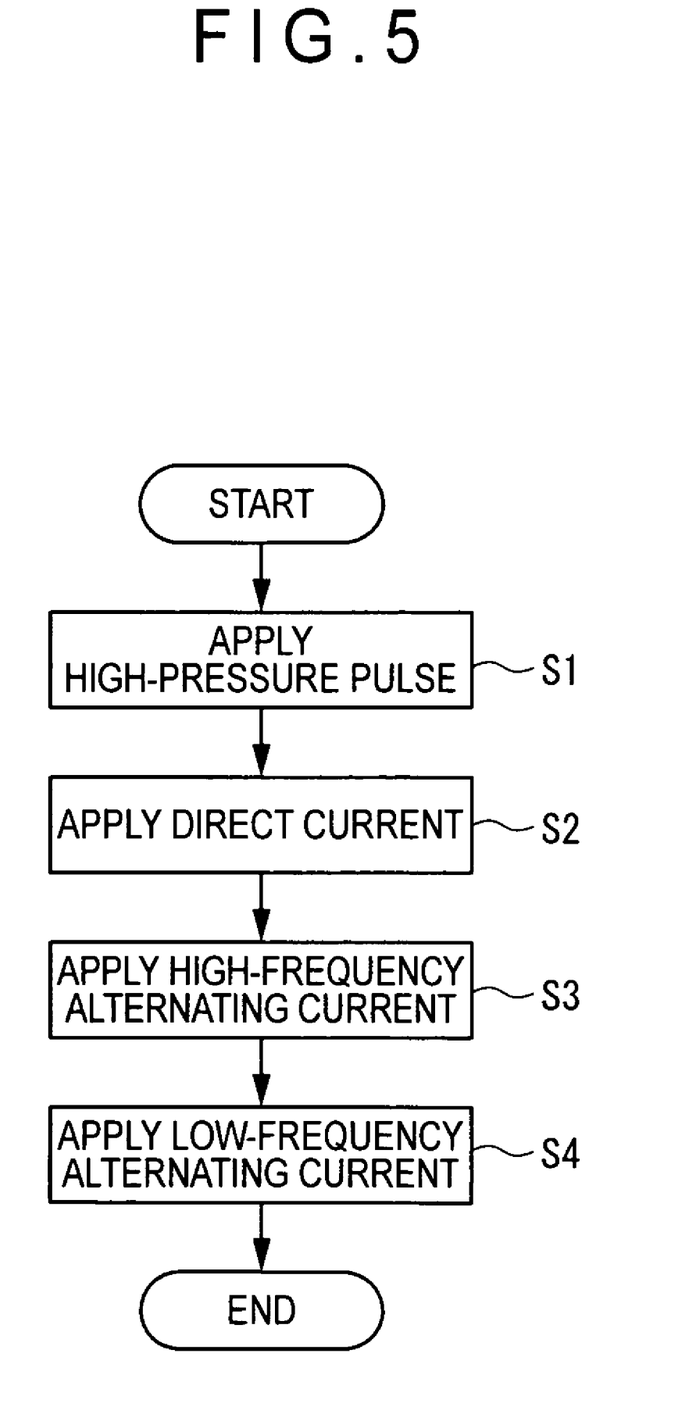
FIG. 5 is a flowchart showing an ignition control process of the above exemplary embodiment.

FIG. 5 is a flowchart showing an ignition control process for the discharge lamp 5 by the ignition controller 8.

The ignition controller 8 executes the ignition control process for the discharge lamp 5 after receiving the control signal input from the control unit 93 for igniting the discharge lamp 5. The startup process is executed in accordance with the ignition control program memorized in a memory unit (not shown) provided in the ignition controller 8.

In the process of the ignition control process, as shown in FIG. 5, the pulse applying unit 821 of the controller 82 input a control signal to the igniter circuit 813 to apply a high pressure pulse to the electrodes 5111 and 5112 of the discharge lamp 5 by the igniter circuit 813 (a pulse applying step S1).

Then, the direct current applying unit 822 controls the on/off state of respective transistors 8121 and 8122 in the inverter bridge 812 to apply the direct current so that the direct current flows from the anode electrode 5112 to the cathode electrode 5111 during the direct current startup period (a direct current applying step S2).

Note that cooling air distributed from the cooling unit 91 flows along the reflector 6. Therefore, the electrodes 5111 are easier to be cooled than the electrode 5112 out of the electrodes 5111 and 5112 of the discharge lamp 5 since the electrode 5111 are adjacent to the reflector 6. Since the sub-reflector 52 is provided with the light-emitting tube 51, the light-emitting tube 51 prominently exhibits such characteristics. Therefore, when the discharge lamp 5 is turned off, mercury contained in the light-emitting material is adhered on the easily-to-be-cooled electrode 5111.

Accordingly, when the inverter bridge 812 applies the direct current to flow from the electrode 5111 to the electrode 5112, the current hardly flows in the inverter bridge 812, which suppresses the temperature increase in the electrodes 5111 and 5112, thereby restraining acceleration the mercury evaporation. This problem delays the transition from the glow discharge period to the arc discharge period of the discharge lamp 5, thereby deteriorating starting performance of the discharge lamp 5 and causing damage on the electrodes 5111 and 5112.

In the step of S2, however, the direct current is applied to the electrode 5112, to which mercury is less likely to be adhered, so that the direct current flows from the electrode 5112 to the electrode 5111. This allows the current to flow satisfactorily between the electrodes 5111 and 5112, leading to the temperature rise in the electrodes 5111 and 5112 and the accelerated mercury evaporation. Consequently, the glow discharge period is rapidly shifted to the arc discharge period of the discharge lamp 5, so that the starting characteristics of the discharge lamp 5 are improved.

After the direct current startup period, the alternating current applying unit 823 alternately switches the on/off state of respective transistors 8121 and 8122 so that the inverter bridge 812 applies the alternating current to the electrodes 5111 and 5112 during the alternating current startup period (an alternating current applying step S3). Accordingly, the current is reliably applied to the respective electrodes 5111 and 5112, leading to further temperature rise in the electrodes 5111 and 5112 and the further accelerated mercury evaporation.

After the process of the alternating current startup period, the steady lighting control unit 824 alternately switches the on/off state of the respective transistors 8121 and 8122 so that the inverter bridge 812 applies to the electrodes 5111 and 5112 alternating current with a frequency that is lower than the average frequency of the alternating current applied during the alternating current startup period (a steady lighting step S4). By applying the alternating current with the above-described frequency to the electrodes 5111 and 5112, the lighting of the discharge lamp 5 is stabilized to prevent damage on the electrodes 5111 and 5112.

With regard to the lighting control process, a length of the direct current startup period for applying the direct current in the step S2 and the damage on the electrodes 5111 and 5112 corresponding to the frequency of the alternating current applied in the step S3 will be described below.

Figure 6:
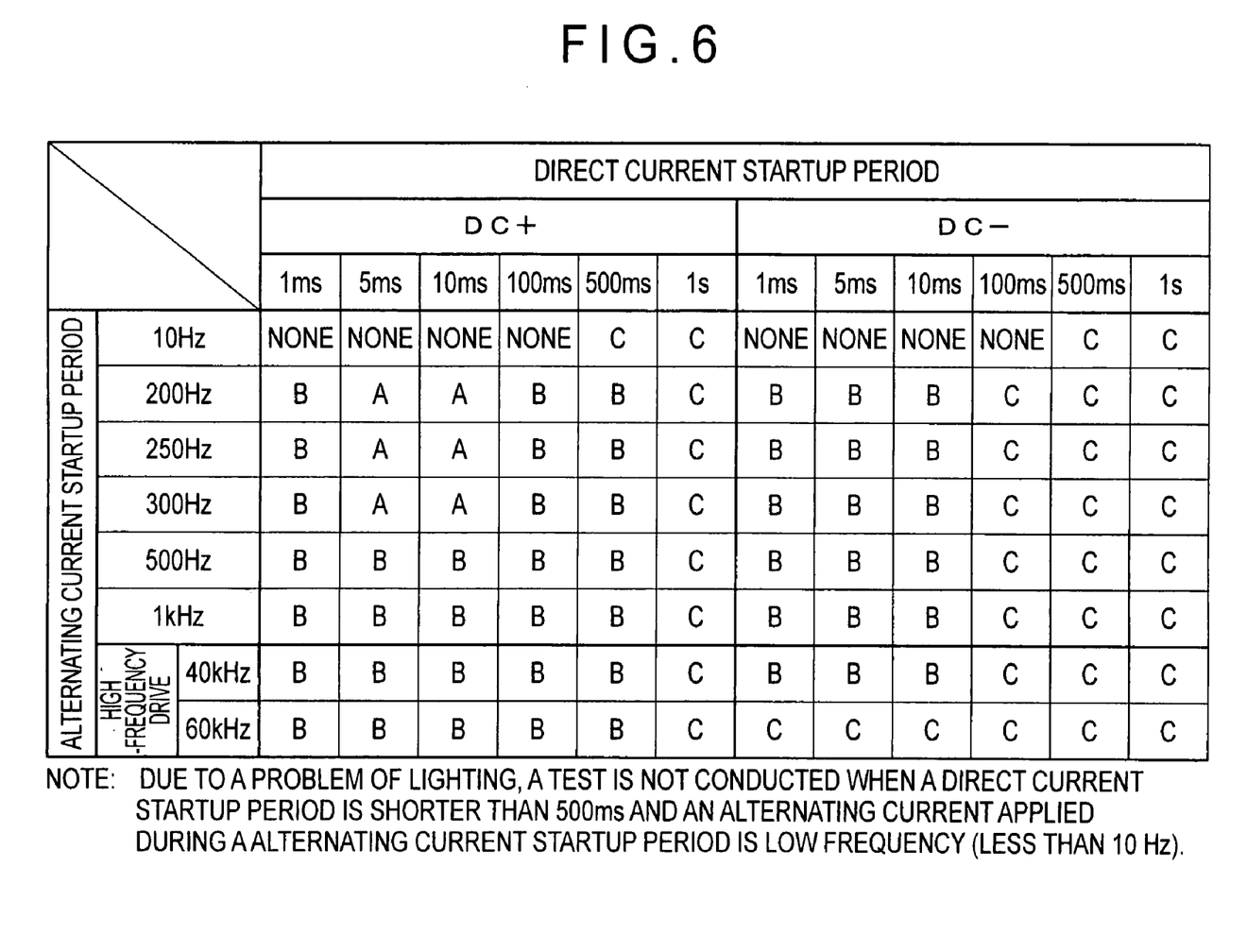
FIG. 6 illustrates degree of damage given to the electrode corresponding to a length of a direct current startup period and a frequency of an alternating current applied during an alternating current startup period of the above exemplary embodiment.

FIG. 6 illustrates degree of damage given to the electrodes corresponding to the length of the direct current startup period and the frequency of the alternating current applied during the alternating current startup period. In FIG. 6, "DC+" indicates a direct current flow from the electrode 5112 to the electrode 5111. "DC−" indicates a direct current flow from the electrodes 5111 to the electrodes 5112. Further, "A" indicates little damage on the electrode and "B" indicates a little damage on the electrodes. "C" indicates serious damage on the electrodes and "None" indicates that the test is not conducted due to a problem of the lighting. "ms" indicates "msec" (millisecond).

Firstly, the lighting control process is executed such that the direct current flows from the electrodes 5111 to the electrode 5112 during the direct current startup period (DC−).

The duration of the direct current startup period is set between and including 1 msec and 10 msec and the frequency of the alternating current applied during the alternating current startup period is set to be higher than 10 Hz and 60 kHz or lower (especially, 200 Hz or higher to 40 kHz or lower), as shown in FIG. 6, the damage on the electrodes 5111 and 5112 is prevented as compared to the case where the duration of the direct current startup period is longer than 10 msec and 1 sec or shorter and the frequency of the alternating current applied during the alternating current startup period is 10 Hz or 60 kHz.

Secondly, the lighting control process is executed such that the direct current flows from the electrodes 5112 to the electrode 5111 during the direct current startup period (DC+).

When the duration of the direct current startup period is set to be 1 msec or longer and shorter than 10 msec and the frequency of the alternating current applied during the alternating current startup period is set to be higher than 10 Hz and 60 kHz or lower (especially from 200 Hz to 60 kHz), as shown in FIG. 6, the damage on the electrodes 5111 and 5112 is restrained as compared to the case where the direct current startup period is set to be 1 sec or longer or the frequency of the alternating current applied during the alternating current startup period is set to be 10 Hz.

Especially, when the duration of the direct current startup period is between and including 5 msec to 10 msec and the frequency of the alternating current applied during the alternating current startup period is from 200 Hz to 300 Hz, the electrodes 5111 and 5112 are hardly damaged.

Consequently, in the above ignition control process, the electrodes 5111 and 5112 are prevented from damage most effectively when the direct current is applied in the direction from the electrodes 5112 to the electrode 5111 for the duration between and including 5 msec to 10 msec in the step S2 and the alternating current with the frequency from 200 Hz to 300 Hz is applied to the electrodes 5111 and 5112 in the step S3 for igniting the discharge lamp 5.

The projector 1 of the exemplary embodiment of the invention provides the following advantages.

When the ignition controller 8 of the light source 411 actuates the discharge lamp 5 of the light source 411, the pulse applying unit 821 of the ignition controller 8 applies the high pressure pulse to the electrodes 5111 and 5112 through the igniter circuit 813 of the ignition device 81 to effect the breakdown between the electrodes 5111 and 5112.

The direct current applying unit 822 applies the direct current to the pair of electrodes 5111 and 5112 through the inverter bridge 812 in the direct current applying step S2. Since sufficient, electrical power is supplied to the electrodes 5111 and 5112 during the glow discharge period, the temperature increase in the electrodes and the evaporation of the mercury adhered to the electrode 5112 can be accelerated, and the rapid transition from the glow discharge period to the arc discharge period can be promoted. Thus, the damage on the electrodes 5111 and 5112 are prevented.

In the alternating current applying step S3, the alternating current applying unit 823 applies the alternating current to the pair of electrodes 5111 and 5112 through the inverter bridge 812 for the alternating current startup period selected from the range between and including 1 sec and 3 sec. Accordingly, the current is effectively applied to the respective electrodes 5111 and 5112 in accordance with reversal of polarity of the applied current, leading to the further temperature rise in the electrodes 5111 and 5112 and the further mercury evaporation. Thus, the starting characteristics and light-emitting efficiency of the discharge lamp 5 can be improved.

The alternating current applying unit 822 applies the direct current to the electrodes 5111 and 5112 through the inverter bridge 812 in the direction from the hard-to-be-cooled electrode 5112 and is positioned away from the reflector 6 to the easier-to-be-cooled electrode 5111 that is positioned adjacent to the reflector 6. Accordingly, the current is reliably applied to the electrode 5111, leading to the temperature rise in the electrode 5111 and evaporation of the mercury adhered to the electrode 5111 when the discharge lamp 5 is turned off. Further, the current is thus capable of readily flowing between the electrodes 5111 and 5112 so that the rapid transition from the glow discharge period to the arc discharge period can be realized. Therefore, the starting characteristics of the discharge lamp 5 is further improved and the damage on the electrodes are further prevented.

The direct current startup period for applying the direct current in the direct current applying step S2 is set between and including 1 msec to 500 msec. With this arrangement, the damage on the electrodes 5111 and 5112 can be reliably prevented as shown in FIG. 6. Additionally, it is preferable that the direct current is applied to flow from the electrode 5111 to the electrode 5112. Further, damage on the electrodes 5111 and 5112 can be more reliably restrained when the duration of the direct current startup period is set between and including 5 msec and 10 msec. Accordingly, a prolonged life of the discharge lamp 5 can be realized.

The frequency of the alternating current applied in the alternating current applying step S3 is set to be higher than 10 Hz and 60 kHz or lower (especially, from 200 Hz to 60 kHz). With this arrangement, the current can be fully applied to the electrodes 5111 and 5112 and the starting characteristics of the discharge lamp 5 can be improved. Consequently, since the alternating current with the relatively low frequency is applied, components with high frequency characteristics are not required and the applied current is easily controlled. Therefore, the arrangement of the ignition controller 8 can be simplified in addition to preventing the damage on the electrodes 5111 and 5112.

When the alternating current with relatively high frequency is kept on being applied, damage on the electrodes 5111 and 5112 becomes prominent. In the steady lighting step S4, however, the steady lighting control unit 824 applies the alternating current of 100 Hz, which is lower than the average frequency of the alternating current applied in the alternating current applying step S3. Therefore, the damage on the electrodes 5111 and 5112 is reliably prevented while the discharge lamp 5 is steadily ignited. The light of the discharge lamp 5 is thus stabilized in addition to the prolonged life of the discharge lamp 5.

Modification of Exemplary Embodiment

The invention is not restricted to the above-described exemplary embodiment, but includes modifications and improvements as long as an object and an advantage of the invention can be achieved.

In the exemplary embodiment, the direct current applying step S2 applies the direct current in the direction from the electrode 5112 to the electrode 5111. However, the direct current applying step S2 may apply the direct current adversely. In other words, the current can be applied in either direction.

In the exemplary embodiment, the duration of the direct current startup period corresponding to the first period is set in the range between and including 1 msec and 500 msec. However, the invention is not restricted to the specific range. Further, the frequency of the alternating current applied in the alternating current startup period corresponding to the second period is set to be higher than 10 Hz and 60 kHz or lower and the alternating current startup period is set in the range between and including 1 sec and 3 sec. However, the invention is not restricted to the above range. In other words, the duration of the direct current startup period and the alternating current startup period may be set in any manner and the frequency of the alternating current can vary as long as the electrodes 5111 and 5112 are not damaged by applying the direct and alternating current.

Although the steady lighting control unit 824 applies the alternating current of 100 Hz to the electrodes 5111 and 5112 in the exemplary embodiment, the invention is not restricted to the above frequency. In other words, the frequency of the alternating current applied to the electrodes 5111 and 5112 by the steady lighting control unit 824 may be set in any manner as long as the frequency is lower than the average frequency of the alternating current applied during the alternating current startup period.

In the exemplary embodiment, the projector 1 includes the three liquid crystal panels 442R, 442G and 442B. However, the invention is not restricted to the above three panels. In other words, the invention may be applied to a projector having two or less, or four or more of liquid crystal panels.

Although the optical unit 4 has the approximately L-shape in plan view in the exemplary embodiment, the arrangement is not limited thereto. For example, the optical unit 4 may have an approximately U-shape in plan view.

Further, the transmissive liquid crystal panels 442 having different light-incident side and light-irradiation side is used in the exemplary embodiments, a reflective liquid crystal panel having common light-incident side and light-irradiation side may be used.

Although the projector 1 including the liquid crystal panels 442 as the optical modulator is exemplified in the exemplary embodiment, any optical modulator may be employed as long as the optical modulator modulates an incident light beam in accordance with image information to form an optical image. For example, the invention can be applied to a projector using an optical modulator other than the liquid crystal panel, e.g., a device using a micromirror. When such optical modulator is used, the incident-side and irradiation-side polarization plates 443, 445 may be omitted.

Although the projector 1 includes the light source 411 having the discharge lamp 5 and the ignition controller 8 in the exemplary embodiment, the invention is not restricted thereto. The light source 411 may be used as an illuminator such as a stand. Further, the ignition controller 8 may be used as an independent component.

The invention can be utilized as an ignition controller of a discharge lamp, especially as an ignition controller of a discharge lamp for a projector.

What is claimed is:

1. An ignition controller that controls ignition of a discharge lamp discharging and emitting light between a pair of electrodes provided therein, the ignition controller comprising:
    an ignition device that ignites the discharge lamp, and
    a controller that controls a drive of the ignition device, wherein
    the discharge lamp includes: a light-emitting tube having a light-emitting portion in which a pair of electrodes including a first electrode and a second electrode are disposed and a discharge space is formed between the pair of electrodes; and a reflector attached on an end of the light-emitting tube to reflect the light irradiated from the light-emitting portion substantially in a same direction as an illumination optical axis of the discharge lamp,
    the controller includes:
    a pulse applying unit that applies a high pressure pulse to the pair of electrodes by the ignition device;
    a direct current applying unit that applies a direct current to the pair of electrodes for a first period after applying the high pressure pulse; and
    an alternating current applying unit that applies a first alternating current to the pair of electrodes for a second period after the first period, wherein
    the direct current applying unit applies the direct current to the second electrode so that the direct current flows from the second electrode to the first electrode located adjacent to the end of the light-emitting tube fixed to the reflector.

2. The ignition controller according to claim 1, wherein the first period is between and including 1 msec and 500 msec.

3. A light source comprising:
    the ignition controller according to claim 2, the discharge lamp further including a pair of sealing portions which extend away from each other sandwiching the light-emitting portion and provides an electrode-connecting wire for connecting to the respective electrodes, and the reflector provided on one of the pair of sealing portions to reflect the light irradiated from the light-emitting portion in one direction.

4. The ignition controller according to claim 1, wherein a frequency of the alternating current applied to the discharge lamp during the second period is higher than 10 Hz and equal to or lower than 60 kHz.

5. A light source comprising:
the ignition controller according to claim 4, the discharge lamp further including a pair of sealing portions which extend away from each other sandwiching the light-emitting portion and provides an electrode-connecting wire for connecting to the respective electrodes, and the reflector provided on one of the pair of sealing portions to reflect the light irradiated from the light-emitting portion in one direction.

6. The ignition controller according to claim 1, further comprising:
a steady lighting control unit that steadily lights the discharge lamp after the second period by applying a second alternating current to the discharge lamp with a frequency lower than an average frequency of the first alternating current applied to the discharge lamp during the second period.

7. A light source comprising:
the ignition controller according to claim 6, the discharge lamp further including a pair of sealing portions which extend away from each other sandwiching the light-emitting portion and provides an electrode-connecting wire for connecting to the respective electrodes, and the reflector provided on one of the pair of sealing portions to reflect the light irradiated from the light-emitting portion in one direction.

8. A light source comprising: the ignition controller according to claim 1, the discharge lamp further including a pair of sealing portions which extend away from each other sandwiching the light-emitting portion and provides an electrode-connecting wire for connecting to the respective electrodes, and the reflector provided on one of the pair of sealing portions to reflect the light irradiated from the light-emitting portion in one direction.

9. A projector comprising the light source according to claim 8.

10. The ignition controller according to claim 1, wherein the second period is between and including 1 second and 3 seconds; and
the controller further includes a steady lighting control unit that applies a second alternating current to the pair of electrodes for a third period after the second period,
the second alternating current having a frequency lower than an average frequency of the first alternating current.

11. An ignition control method for controlling ignition of a discharge lamp discharging and emitting a light between a pair of electrodes provided in the discharge lamp, the discharge lamp including: a light-emitting tube having a light-emitting portion in which a pair of electrodes including a first electrode and a second electrode are disposed and a discharge space is formed between the pair of electrodes; and a reflector attached on an end of the light-emitting tube to reflect the light irradiated from the light-emitting portion substantially in a same direction as an illumination optical axis of the discharge lamp,
the method comprising:
applying a high pressure pulse to the pair of electrodes,
applying a direct current to the second electrode so that the direct current flows from the second electrode to the first electrode located adjacent to the end of the light-emitting tube fixed to the reflector for a first period after applying the high pressure pulse, and
applying an alternating current to the pair of electrodes for a second period after the first period.

* * * * *